July 11, 1950     C. J. SCRANTON     2,514,560

SPRING TINE MOUNTING

Filed June 13, 1946

INVENTOR
Charles J. Scranton
BY
J. J. Kane
ATTORNEY

Patented July 11, 1950

2,514,560

UNITED STATES PATENT OFFICE 2,514,560

SPRING TINE MOUNTING

Charles J. Scranton, La Porte, Ind., assignor to Allis-Chalmers Manufacturing Company, Milwaukee, Wis., a corporation of Delaware Application June 13, 1946, Serial No. 676,494

5 Claims. (Cl. 56—400)

This invention relates to agricultural and other types of machines, implements and the like embodying one or more spring-tine carrying members arranged in any desired manner of which but one example is the reel assembly of a side delivery rake.

In general, it is desirable to mount spring-tine elements on a reel bar or other supporting member in the manner disclosed and claimed in Merle W. Bloom's copending application Serial No. 554,422, filed September 16, 1944, for Spring Tine Mounting, now United States Patent No. 2,432,653, as such a mounting permits the tine elements to be severally readily secured to or removed from the supporting member with a minimum of time and effort. In addition, the above mentioned mounting provides a simplified, durable and inexpensive construction affording an effective support for the coil portion or portions of the tine element during both raking and tedding operations.

The tine elements of hay rakes and the like are subjected to extremely rough usage and breakage of such elements is a common occurrence. And since a break in such an element usually occurs between the coil portion thereof and the loop or part secured to the reel bar, the types of severally detachable mountings heretofore employed are incapable, in the absence of some additional means such as a wire loop which passes through the coil and is secured to the reel bar or mounting, of preventing the freed portion of a broken tine element from falling from the bar.

The presence of broken tine elements in hay or other material to be fed to animals and/or requiring further treatment or handling creates an obvious hazard. And although use of the additional means mentioned above will eliminate the hazard, the use of such means is not entirely satisfactory in that it is frequently intentionally or inadvertently dispensed with primarily because of the additional time and effort required in order to remove and replace the coil retaining loop and also because such loops are sometimes lost or broken.

And the present invention is directed toward and has as its object the provision of an improved spring-tine mounting affording all of the advantages hereinbefore mentioned in reference to the copending Bloom application and affording the further advantage of preventing a broken tine element from falling from the carrying bar without the use of auxiliary or additional parts.

The construction and application of a spring-tine mounting embodying the invention will become readily apparent as the disclosure progresses and particularly points out characterizing features considered of special importance. And accordingly the present invention may be considered as comprising a readily detachable spring-tine mounting embodying parts constructed and combined to afford the aforementioned and other advantages as hereinafter more fully set forth in the appended claims and in the detailed description, reference being had to the accompanying drawing illustrating one embodiment of the invention and in which:

Figures 1, 2:
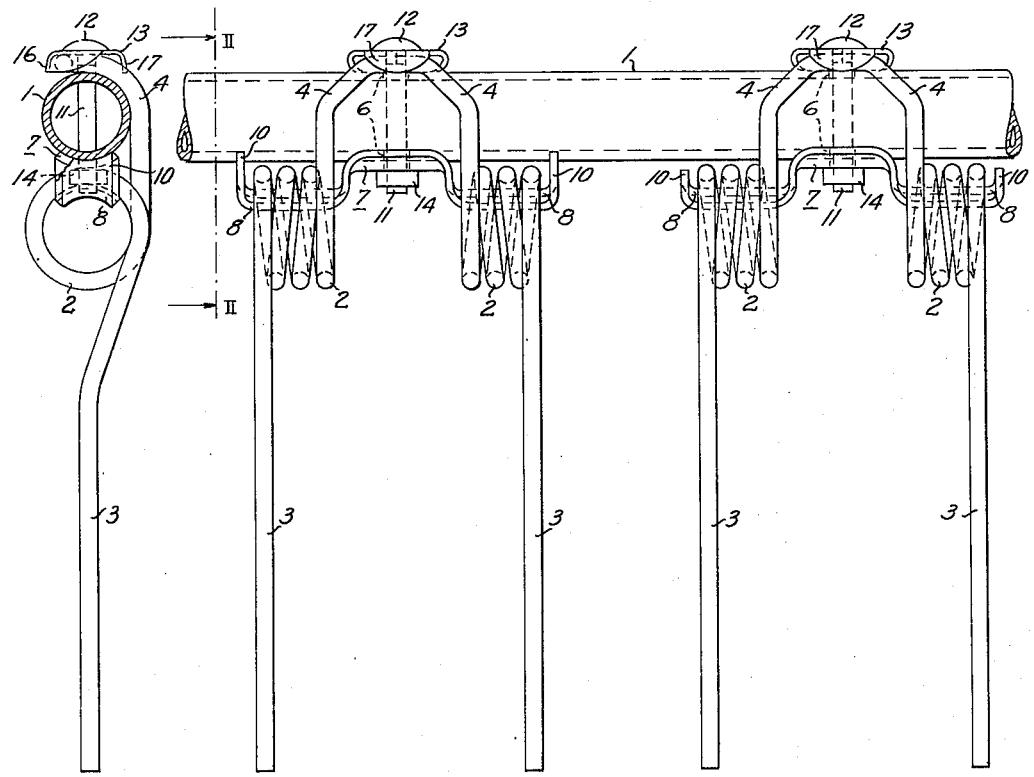
Fig. 1 is a partial front elevation of a rake reel bar embodying the invention.
Fig. 2 is a view taken on line II—II of Fig. 1.

Referring to the drawing, it is seen that the invention may be applied to a tubular reel bar member or the like 1 and to dual toothed spring-tine elements including a pair of spaced opposed coil portions 2, a tooth portion 3 extending from the outer side of each coil portion, and a loop portion 4 uniting the coil portions 2 and extending away therefrom preferably in an opposite direction with respect to tooth portions 3; the outer extremity or mid-section of loop portion 4 being preferably bent or otherwise shaped to engage the top side of tubular member 1 with coil portions 2 disposed in spaced adjacent parallel relation with respect to the opposite or underside of member 1 as is best indicated in Figs. 1 and 2.

Figure 3:
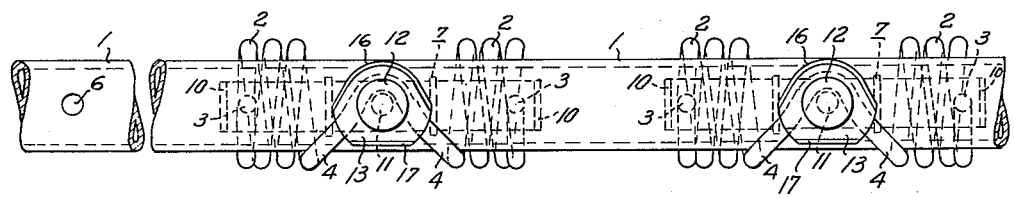
Fig. 3 is a top plan view of the structure shown in Fig. 1.

Member 1 is provided with a series of longitudinally spaced pairs of alined holes or bolt receiving bores 6 and the spring-tine elements are readily detachably secured to member 1 by means of a part 7 having oppositely extending coil supporting portions 8 and an offset, apertured intermediate portion 9 adapted to engage the underside of member 1 with the aperture therein alined with a pair of bolt receiving bores 6 and by means of a carriage bolt part or element 11 having a head portion 12 engaged by loop portion 4 as is best indicated in Fig. 3 with its opposite or nut engaging end projecting through the aperture in the offset portion 9 of part 7.

The portions 8 of part 7 extend entirely through coil portion 2 and terminate in offset ends 10 coacting with the adjacent side of bar member 1 so as to prevent the coil and tooth portions of a broken tine element from falling from part 7. The offset end 10 of each portion 8 may be dimensioned either to firmly abut the adjacent side of member 1 and thereby brace the end extremities of part 7 or to be spaced from such side of member 1 a distance preferably somewhat less than the diameter of the wire of coils 2. In either case, the ends 10 and intermediate portion 9 are similarly offset for a distance somewhat greater than the diameter of the wire of coils 2 and in all cases intermediate portion 9 is offset for a distance sufficient to abut member 1 with the portion or portions 8 and the coil or coils 2 disposed in spaced parallel relation with respect to such member. Both types of end constructions are shown in Fig. 1 and either one or both may be employed as desired.

The head portion of part 11 is preferably provided with a removable washer element or the like 13 shaped to nonrotatably engage and retain loop portion 4 in firm engagement with the upper side of member 1 and the offset portions 9 and 10 of part 7 are preferably shaped to present upper surfaces complementary to the underside of member 1 as is best shown in Fig. 2. Likewise, the portions 8 of part 7 are preferably shaped to conform with the inner peripheral surface of coil portions 2. In this connection, it should be particularly noted (see Fig. 2) that the combined height of portions 8 and of the offset portions of part 7 is less than the inner diameter of coil portions 2 thereby permitting part 7 to be inserted and withdrawn through either coil portion to and from the coil supporting position best shown in Figs. 1 and 2.

Figures 4, 5:
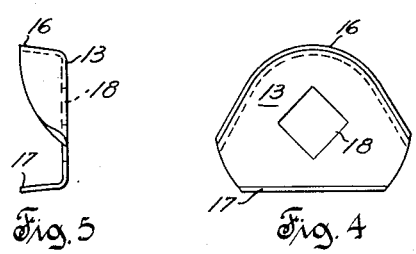
Fig. 4 is a plan view of the tine loop engaging washer element.
Fig. 5 is a side elevation of the washer element shown in Fig. 4.

In assembling the spring-tine element on a reel bar member or the like, the element may be positioned against member 1 with loop portion 4 surrounding a bore 6 therein whereupon parts 7, 13 and 11 may then be assembled in the order named, or if desired, part 7 may be first inserted through a coil portion 2, that is, before the spring-tine element is positioned on member 1. In either case, all that has to be done after insertion of part 11 in order to detachably securely unite the various parts in the relation shown is to apply a nut 14 to the lower exposed end of part 11 and tighten same thereon which can be readily accomplished since, as best shown in Figs. 4 and 5, washer 13 is provided with offset portions 16 and 17 which prevent a turning of the washer relative to loop portion 4 and with a square bolt hole 18 which in turn prevents rotation of the carriage bolt part 11 when the nut is tightened thereon. Obviously, whether the loop or fastening portion of the spring-tine element and the parts 7 and 11 are shaped to engage diametrically opposed exterior surface portions of a tubular member or merely different and preferably spaced surface portions or sides of a tubular or other shaped member is a matter of selection and may be varied as desired. In addition, it is also a matter of selection whether washer element 13 is made integral or separable with respect to part 11.

This type of mounting affords all of the advantages with respect to strength and durability present in prior constructions in which a reel bar member or the like passes through and suitably supports the coil portion or portions of the spring-tine element mounted therein during both tedding and raking operations, and in addition prevents the portions of a spring-tine element normally freed by breakage thereof from falling from detachable part 7. Moreover, a mounting constructed in accordance with this invention affords a greater degree of flexing or spring action than that of the above mentioned prior constructions and at the same time the offset end portions effectively prevent longitudinal deformation of the coil portions of the tine elements. In addition, applicant's construction permits the tine elements to be severally secured to and removed from the supporting member with a minimum of time and effort.

The invention is applicable to various types of spring-tine supported elements and although certain correlations of features are peculiar to spring-tine elements including spaced opposed coil portions and a uniting loop portion, other features are of more general application, and it should therefore be understood that it is not desired to limit the invention to the exact details of construction and correlations of features herein shown and described for purposes of illustration as various modifications within the scope of the appended claims may occur to persons skilled in the art.

It is claimed and desired to secure by Letters Patent:

1. In the combination of a rake reel bar member or the like, a spring-tine element having a coil portion, a tooth portion extending from said coil portion in one direction, a fastening portion extending from said coil portion in another direction, said fastening portion being shaped to engage one side of said member with said coil portion disposed adjacent a different side thereof, the improvement comprising a rigid part having a coil mounting portion joined at each end thereof with an offset portion, each of said offset portions extending from said coil mounting portion in the same direction for a distance greater than the diameter of the wire of said coil, said part being insertable and removable through said coil to and from a position wherein its mounting portion extends entirely through and supports said coil with at least one of said offset portions abutting said member; and means detachably securing said one end portion of said part and said fastening portion of said element to different sides of said member.

2. In the combination of a rake reel bar member or the like, a spring-tine element having a coil portion, a tooth portion extending from said coil portion in one direction, a fastening portion extending from said coil portion in another direction, said fastening portion being shaped to engage one side of said member with said coil portion disposed adjacent a different side thereof, the improvement comprising a rigid part having a coil mounting portion joined at each end thereof with an offset portion, each of said offset portions extending from said coil mounting portion in the same direction for unequal distances both greater than the diameter of the wire of said coil, said part being insertable and removable through said coil to and from a position wherein its mounting portion extends entirely through and supports said coil with one of said offset portions abutting said member and with the other of said end portions spaced from said member a distance less than the diameter of said wire; and means detachably securing said one end portion of said part and said fastening portion of said element to different sides of said member.

3. In the combination of a tubular reel bar member or the like, a spring-tine element having a pair of spaced opposed coil portions, a tooth portion extending from each coil portion, and a loop portion uniting the coil portions, the improvement comprising a first rigid part having spaced alined coil mounting portions presenting similarly offset ends extending therefrom a distance greater than the diameter of the wire of said coil portions and having an intermediate portion uniting said mounting portions and offset relative thereto to a greater extent and in the same direction as said offset ends, said part being insertable and removable through said coils to and from a position wherein its offset intermediate portion is disposed between said coils with its mounting portions extending entirely through and supporting same, with its said intermediate portion abutting said member and with its offset ends opposing said member and spaced therefrom a distance less than the diameter of said wire, and means detachably securing an intermediate section of said loop portion and the intermediate portion of said part to different sides of said member.

4. In the combination with a tubular reel bar member or the like, a spring-tine element having a pair of spaced opposed coil portions, a tooth portion extending from each coil portion, and a loop portion uniting the coil portions, the improvement comprising a first rigid part having spaced alined coil mounting portions presenting similarly offset ends extending therefrom a distance greater than the diameter of the wire of said coil portions and having an intermediate portion uniting said mounting portions and offset relative thereto to the same extent and in the same direction as said offset ends, said part being insertable and removable through said coils to and from a position wherein its offset intermediate portion is disposed between said coils with its mounting portions extending entirely through and supporting same and with its said intermediate portion and offset ends abutting longitudinally spaced portions of said member, and a second part passing through the loop portion of said element, through said member and through the intermediate portion of said part and detachably uniting same.

5. In the combination of a tubular reel bar member or the like, a spring-tine element having a pair of spaced opposed coil portions, a tooth portion extending from each coil portion, and a loop portion uniting the coil portions, the improvement comprising a first rigid part having spaced alined coil mounting portions presenting similarly offset ends extending therefrom a distance greater than the diameter of the wire of said coil portions and having an intermediate portion uniting said mounting portions and offset relative thereto in the same direction as said offset ends and for a distance at least equal to the extent of offset of such ends, said part being insertable and removable through said coils to and from a position wherein its offset intermediate portion is disposed between said coils with its mounting portions extending entirely through and supporting same and with its said intermediate portion abutting said member, and means detachably securing an intermediate section of said loop portion and the intermediate portion of said part to different sides of said member.

CHARLES J. SCRANTON.

REFERENCES CITED

The following references are of record in the file of this patent:

UNITED STATES PATENTS

| Number | Name | Date |
| --- | --- | --- |
| 392,394 | Allderidge | Nov. 6, 1888 |
| 2,171,025 | Crumb et al. | Aug. 29, 1939 |
| 2,237,002 | Kelley | Apr. 1, 1941 |
| 2,432,653 | Bloom | Dec. 16, 1947 |